W. WRIGHT.
COMBINED TYPE WRITING AND COMPUTING MACHINE.
APPLICATION FILED JAN. 17, 1912.
1,265,155. Patented May 7, 1918.
2 SHEETS—SHEET 1.
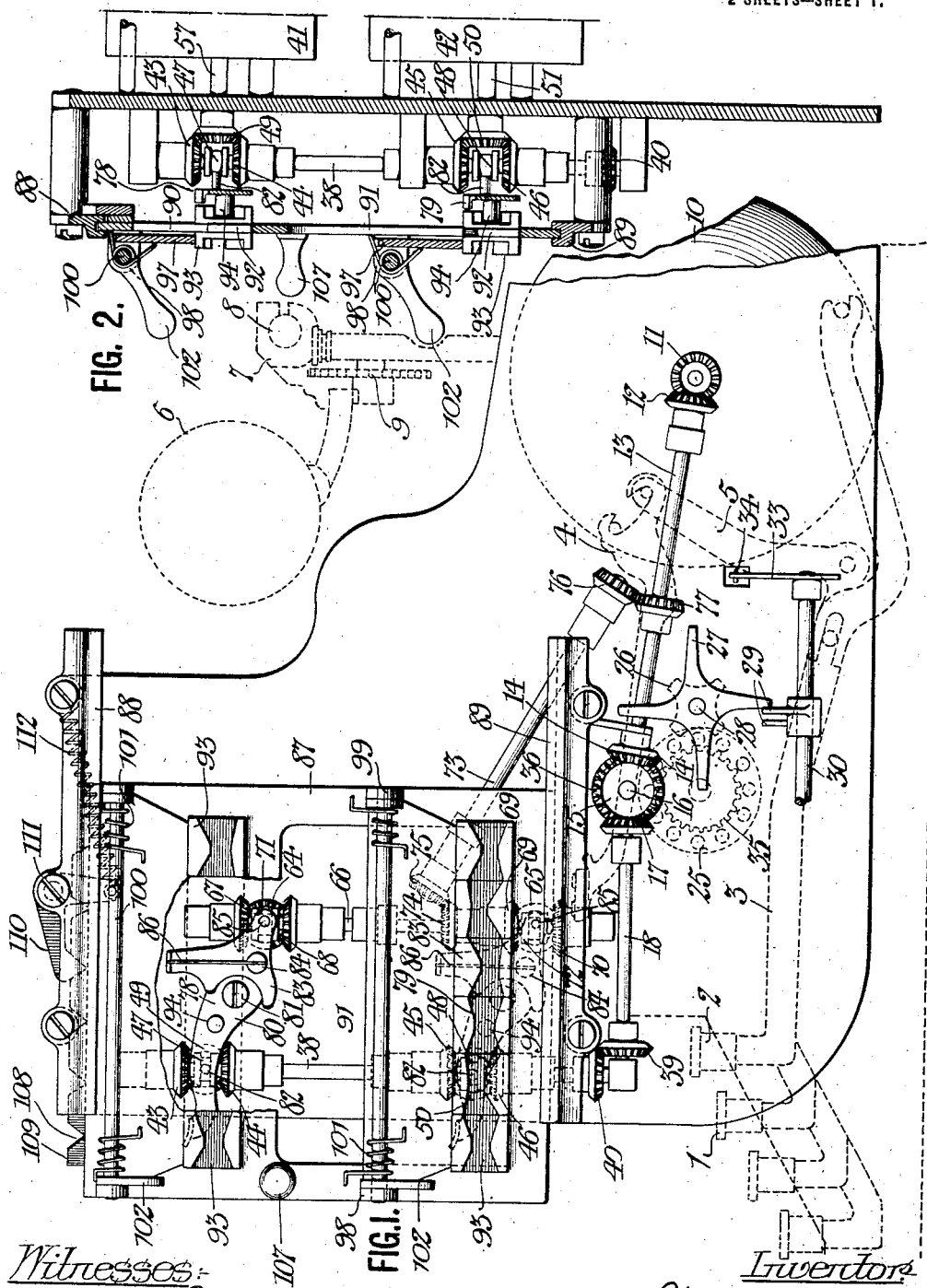

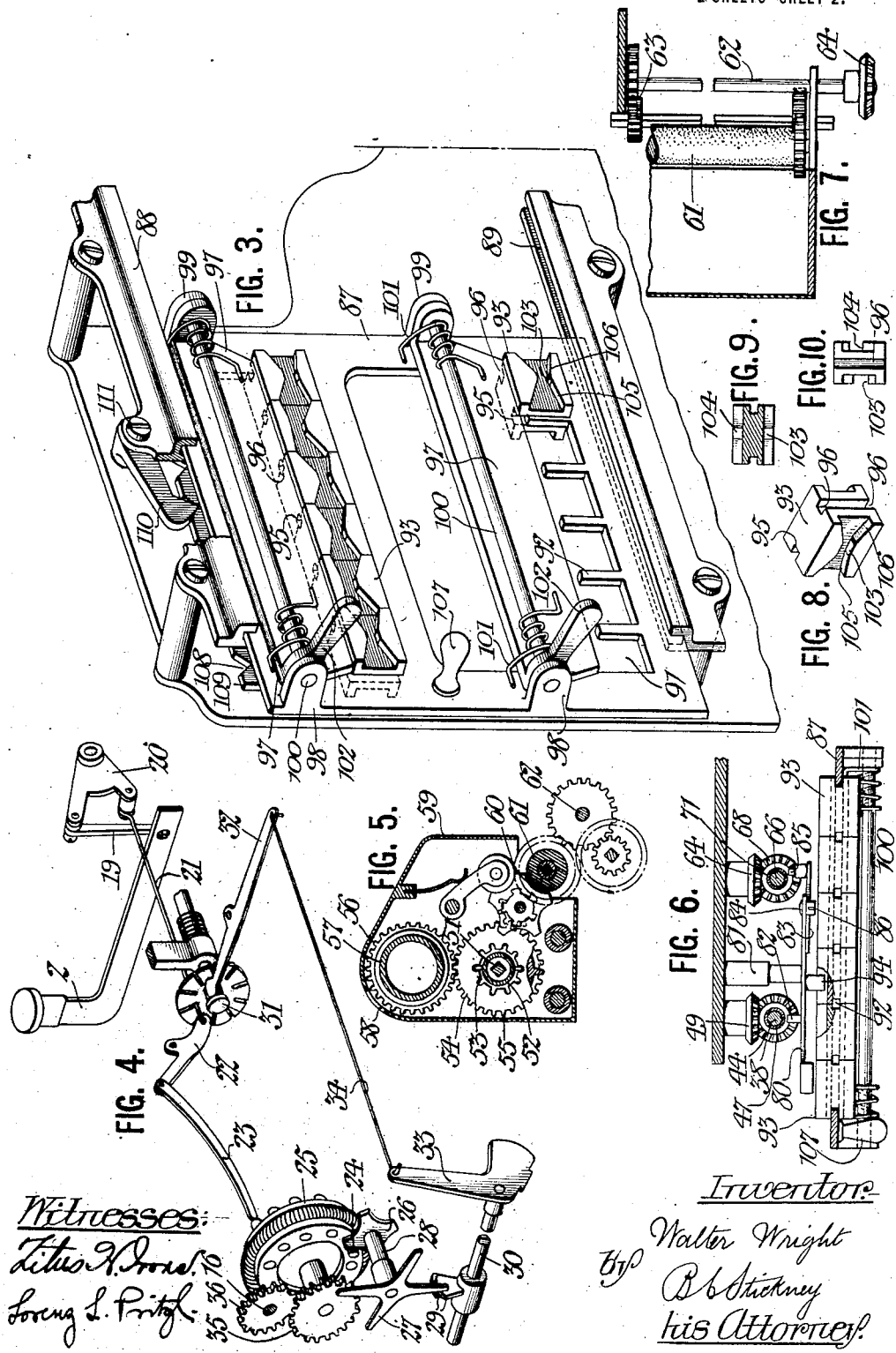

UNITED STATES PATENT OFFICE.

WALTER WRIGHT, OF NEW YORK, N. Y., ASSIGNOR TO UNDERWOOD COMPUTING MACHINE COMPANY, OF NEW YORK, N. Y., A CORPORATION OF NEW YORK.

COMBINED TYPE-WRITING AND COMPUTING MACHINE.

1,265,155.      Specification of Letters Patent.      Patented May 7, 1918.

Application filed January 17, 1912. Serial No. 671,742.

*To all whom it may concern:*

Be it known that I, WALTER WRIGHT, a citizen of the United States, residing in New York city, in the county of New York and State of New York, have invented certain new and useful Improvements in Combined Type-Writing and Computing Machines, of which the following is a specification.

This invention relates to a sliding semi-automatic control for computing heads of a type useful in connection with computing machines such as the Underwood-Wright combined typewriting and computing machine, and is an improvement on Patent No. 1,237,008, granted to Gustave O. Degener and myself, August 14, 1917, and my Patent No. 1,246,009, granted November 6, 1917.

In my above-mentioned Patent No. 1,246,009, I have shown how a plurality of computing heads can be controlled by the manual actuation of a governing mechanism at a single point, to automatically and concomitantly change the states of said plurality of computing heads to predetermined combinations of states, and if desired, according to a predetermined sequence. The purpose of this invention was to save the operator time and thought, and also to eliminate the chance of error in repeating a given operation over and over.

In the form shown in my Patent No. 1,246,009, the governing mechanism which was disclosed was of a rotary type. For certain cases that type has its advantages, but in certain other cases it is surpassed in the facility of use by the form of the present invention.

In the embodiment of the present invention there is disclosed a governing mechanism of a sliding type which may be shifted, preferably although not necessarily, successively to any one of a plurality of positions. The adjustment of the governing mechanism moves shifters for each of the controlling mechanisms of each computing head, so as to bring different locators into engagement therewith, whereby the controlling mechanisms will have their positions determined, so that they in turn can determine the rotation and direction of rotation of the driven parts of the computing heads; these parts being in this instance the master wheels and tens carrying mechanisms.

The locators are shown to be provided with positioning points which determine the position of each controlling mechanism, and have inclined surfaces extending thereto so as to form guides which bring the coöperating part of the controlling mechanisms, shown in this instance to be a pin, to the positioning point. The locators are shown to be duplex, that is to say they have two sides which may be of different form so that when the locators, which are adjustably, reversibly and interchangeably supported, are changed in their position, they may determine other states of the computing heads than those determined by the first sides.

Other features and advantages will hereinafter appear.

In the accompanying drawings,

Figure 1 is a side view in elevation partly broken away to show the underlying structure.

Fig. 2 is a fragmentary vertical section.

Fig. 3 is a detail perspective view with parts removed to show the underlying structure.

Fig. 4 is a skeleton perspective view showing the connection of one numeral key to the valuating mechanism for determining the extent of rotation of the master wheels.

Fig. 5 is a vertical section through one of the computing heads.

Fig. 6 is a horizontal section through the plate showing the relation of the locators thereto, and broken away to show the pin in position in one of the locators.

Fig. 7 is a fragmentary horizontal section showing a detail of the tens carrying gearing.

Figs. 8, 9 and 10 are detail views showing the particular form of one of the locators.

Referring more particularly to the separate parts of this invention as exemplified in the form shown in the drawings, 1 indicates letter keys and 2 indicates numeral keys which actuate key levers 3 to swing type bars 4, through the intermediary of bell cranks 5, against the front side of a platen 6 mounted on a carriage 7 which slides on one or more guides 8. The carriage is permitted to move step-by-step in the usual manner by an escapement mechanism indicated in general by the numeral 9.

The power for driving the driven elements of the computing mechanism is obtained from any suitable source such as the motor indicated at 10, which drives, through a slip clutch not shown, a bevel gear 11, which in turn drives, by meshing with a bevel gear 12, a shaft 13. The shaft 13 is provided with a bevel gear 14 meshing with a bevel gear 15 on a shaft 16. The bevel gear 15 in turn meshes with a bevel gear 17 on a shaft 18. While the shafts 13 and 18 are normally under a driving tension from the motor 10, they will be held against rotation, the lost motion being taken up by the slip clutch not shown, until any one of the numeral keys is struck.

In striking one of the numeral keys 2 it will be seen, by reference to Fig. 4, that they each pull down on the link 19, so as to rock a bell crank 20, and thus pull on a link 21 to swing a lever 22, whereby a jack 23 will be plunged against the one of a series of pins 24 which happens to be in opposition to it, so as to force it through to a projecting position on the opposite side of a valuating wheel 25. A previously projected pin 24 will hold the valuating wheel 25 against rotation by engagement with an escapement wheel 26, which in turn is held by an escapement wheel 27 on a common shaft 28. The escapement wheel 27 engages one of a pair of locking lugs 29 on a rock shaft 30.

The rock shaft 30 is oscillated at each actuation of a numeral key by being operatively connected to a collar 31 which is actuated by each of the levers 22, so that the collar 31 will rock a lever 32, which in turn swings an arm 33 secured on the rock shaft 30 through the intermediary of a connecting link 34.

The valuating wheel 25, when thus released to rotate a certain extent depending upon the particular numeral key struck, will in turn permit the rotation of the bevel gear 15 and the parts connected thereto by the concomitant rotation of gears 35 and 36, which connect the shaft 16, on which the bevel gear 15 and the gear 36 are secured, in positive relation with the valuating wheel 25.

The drive from the shaft 18 is transmitted to a shaft 38 by means of meshing bevel gears 39 and 40. This shaft 38 is adapted to drive the master wheels of the computing heads 41 and 42. To accomplish this, the shaft 38 is provided with a pair of loosely mounted bevel gears for each computing head faced in opposite directions. These bevel gears are indicated by the numerals 43, 44, 45 and 46. In order to connect either one of either pair of bevel gears in driving relation with the shaft 38, there are provided clutches 47 and 48 splined on the shaft 38 and having teeth adapted to engage corresponding teeth on the inwardly facing sides of the gears 43 to 46. The pairs of gears numbered 43 to 46 mesh with bevel gears 49 and 50, which are on the master wheel shafts, and are adapted to drive the master wheels in either direction. It is to be noted in passing that the clutches 47 and 48 may also occupy an intermediate or inactive position in which neither member of each pair of gears is connected in driving relation with the shaft 38, so that the master wheel may be silenced.

Inasmuch as the arrangement of each computing head is the same, only one will be described. The master wheel shafts, which are driven by the bevel gears 49 and 50, are indicated by the numeral 51, and are squared so that the master wheels, of which one is shown at 52 in Fig. 5, may slide on the shaft and still rotate therewith. The master wheel, as it slides on the shaft 51, comes successively into engagement with internal teeth forming internal gears 53 on a series of computing wheels 54. These computing wheels 54 are also provided with external teeth forming external gears 55 which mesh with corresponding gears 56 carrying numeral or dial wheels 57, which are adapted to successively exhibit the numerals run up through an aperture 58 in the computing head casing 59.

It is essential in this type of a computing head to carry each complete rotation of a lower denomination computing wheel to the next higher denomination computing wheel. For this purpose there is provided a tens carrying mechanism, indicated in general at 60, which is more fully described in said Patent No. 1,237,008, and depends for its action on the rotation and direction of rotation of a rubber roller 61. This rubber roller 61, in each instance, obtains its drive from a shaft 62 through the intermediary of connecting gearing, indicated in general by the numeral 63.

These shafts 62 are provided with bevel gears 64 and 65, which correspond to the bevel gears 49 and 50, and are driven in a similar manner. Meshing with the bevel gears 64 and 65, there are provided on a shaft 66 pairs of bevel gears facing in opposite directions and indicated by the numerals 67, 68, 69 and 70. These gears 67 to 70 are loosely mounted on the shaft 66, but can be connected to rotate therewith by means of clutches 71 and 72, one of which is placed between each pair. These clutches can connect either one of the pair of gears in driving relation with the shaft 66, so that the gears 64 and 65 will be driven in either one of two directions, and the clutches can also occupy an intermediate position corresponding to the interruption of the drive from the shaft 66 to the gears 64 and 65.

The shaft 66 obtains its drive from the shaft 13 by means of a shaft 73, which is connected to the shaft 66 at the other end by the meshing gears 74 and 75, and is connected to the shaft 13 at one end by the meshing gears 76 and 77.

In order that the clutches for each computing head controlling the rotation and direction of rotation of the master wheel and tens carrying mechanism may be shifted concomitantly, there is provided for the computing heads 41 and 42, respectively, composite levers 78 and 79, each of which comprises a main lever 80 pivoted intermediate its ends, as at 81, and having a pin 82 engaging in a circular groove in the master wheel clutch; a supplementary lever 83 is pivotally mounted on the main lever 80 as by means of a pin 84, and also has a pin 85 engaging a circular groove in the tens carrying clutch.

The main lever 80 and the supplementary lever 83 have a limited play relative to each other, which may be taken up by means of a spring 86 secured at one end to the pin 84 on the lever 80 and at the other end to the supplementary lever 83. The main levers 80 project in front of the machine so that they can be manipulated to change the state of the accordant computing head. It is desirable, however, to permit all of the computing heads to be concomitantly changed in their state by the movement of a single member, and for this purpose there is provided a governing mechanism which is adapted to shift each of the individual controlling mechanisms for the computing heads according, if desired, to any predetermined plan.

For this purpose, the governing mechanism embodies a plate 87 slidingly mounted in opposed spaced guides 88 and 89 supported in any suitable manner on the frame of the machine. This plate 87 may be provided with openings 90 and 91, from the bottom of which project upwardly into the openings, and in the plane of the plate, spaced dents or teeth 92.

The dents 92 form, with the plate 87, means for securing in position a series of locators 93, which, when arranged end to end, form shifters adapted to engage with pins 94 on the main levers 80 of the composite levers 78 and 79, so as to adjust these composite levers which form a part of the controlling mechanism for the computing heads, whereby the state of the accordant computing heads may be controlled as to the character of work carried on thereby.

It will be seen by reference to Figs. 3 and 8 that each of these locators 93 is provided with grooves 95 and 96 which are adapted to engage the dents 92 and the margins of the openings 90 and 91, so as to maintain themselves in position on the plate 87. A further means of maintaining the locators 93 on the plate 87, so that they will not be forced off in an upward direction, consists, in the case of each of the shifters, of a guard 97 shown in the form of a retaining bar extending across the top of all of the locators 93 and mounted on the plate 87 in such a manner that it can be moved into and out of engagement with the top edges of said locators. The means for mounting in this instance is shown to consist in a pair of brackets 98 and 99 forming a support for a rod 100 on which the bar 97 is mounted. The bar 97 is normally held in a position to engage the tops of the retainers 93 by a plurality of springs 101, but may be forced against the tension of said springs out of engagement with said locators, so as to permit said locators to be adjusted, reversed or interchanged, by means of a handle 102 secured to the bar 97. The purpose of reversing and interchanging the locators 93 is to vary their individual effect on the controlling mechanism, and also to vary the sequence of effect on the controlling mechanism.

In order that the locators will have different effects when reversed, they are duplex, that is to say, provided with two effective sides which, however, have different effects. This is brought about, as will be seen by reference to Figs. 8 to 10, by providing each locator with positioning points 103 and 104, which, however, are out of alinement with each other, that is to say, at different distances from the tops or bottoms of the locators. Each distinct positioning point, of which there are three, when in coöperation with one of the pins 94, will determine the position of the corresponding controlling mechanism according to one of three positions corresponding to the adding or subtracting action of the accordant computing head, or to a neutral or inactive state of said computing head. It will thus be seen that there must of necessity be three distinct positioning points, that is to say, three positioning points of different kinds.

When the locators are placed in alinement with each other so as to form shifters individual to each controlling mechanism, the active positioning points of certain of the locators will be out of alinement with the active positioning points of certain other locators. In order that the positioning points may come in play with a movement of the plate 87 in either direction, each locator is provided with guiding surfaces 105 and 106, which converge toward the positioning points both above and below and from opposite sides. The positioning points and guiding surfaces are formed by cutting grooves in the locators intermediate raised portions, but might just as well be formed from raised portions intermediate cutaway portions.

To manipulate the plate 87, and thus bring the several locators into coöperation with apposite controlling mechanisms, there is provided on the plate 87 a handle 107. Inasmuch as it is necessary to bring the positioning points of the several locators accurately in engagement with the pins 94, the positioning points on the several shifters are preferably located in vertical alinement with each other, and also in alinement with notches 108 in a locking bar 109 which is secured to the plate 87. These notches 108 are successively engaged by a latch 110 which forms, with the locking bar, locking means for determining the position of the plate 87, and also for securing it against accidental movement. The latch 110, which is pivotally mounted at 111, may be normally urged into engagement with the locking bar 109 in any suitable manner as by means of a spring 112. It will thus be seen that the relative arrangement of the notches 108, the positioning points of the locators, the pins 92 and the latch 110 is such that whenever the latch 110 engages any one of the notches 108, the corresponding locators will have their positioning points in coöperation with the pins 94.

In the use of the device before the actuation of the numeral keys to run up any particular series of computations, the locators 93 can be adjusted on the plate 87 so as to give any desired sequence of states of the plurality of computing heads. Each of the locators may, if desired, correspond to a particular column of the work to be performed on the work sheet on the platen. The computation may then be started with the plate 87 at either end of its stroke and with one of the end locators in each shifter in coöperation with the pins 94 of the controlling mechanisms. The number for the first column may be inscribed on the work sheet on the platen, whereby it will be run up on such of the computing heads as may be active, so that it will be exhibited through the openings 58 in said computing heads. The computing heads which have their controlling mechanism adjusted by the end locator, which is active at this time, to an adding position, will add the number, while the computing heads which have their controlling mechanism adjusted to a subtracting position will subtract the number. Any of the computing heads which have their controlling mechanism adjusted to an intermediate or neutral position will remain silent for this particular position of the governing mechanism determined by the position of the plate 87.

After the number in one column has been written and run up on the computing heads, the plate 87 can be shifted to its next position with the latch 110 in engagement with the next notch 108 by a pull on the button or handle 107. This will bring the next set of locators in coöperation with the pins 94, and if their active positioning points are different from the previous set of locators, they will adjust the pins 94, and thus the controlling mechanisms, to different positions corresponding to different states of the apposite computing heads. This action can be repeated as the writing progresses from one column to another, bringing successively into operation the series of locators, whereby the numerals inscribed in the several columns on the work sheet can be added or subtracted or left out of the several computing heads according to a predetermined plan, which is embodied in the character and sequence of the positioning points of the several locators.

While it is preferable that the governing mechanism should be moved accurately from one position to another so as to bring successive locators into action in their order, the plate 87 is so arranged that it can be shifted in either direction any amount within the limits thereof, so as to bring any pair of locators into action, so that any desired combination of states, as far as are set up previously on the governing mechanism, can be obtained at any time.

It will readily be seen that the retaining bars 97 can be swung against the tension of the springs 101 by manipulation of the handles 102 to permit any of the locators 93 to be removed, reversed or interchanged with other locators, so as to vary the effect at any particular point in the series, and also to vary the sequence of effects in the series.

It will be also observed that the plate 87 can be shifted so far to the rear of the machine that the locators 93 will be clear of their followers 95, in which case the reversing levers 79 and 80 are manually operable.

Variations may be resorted to within the scope of the invention, and portions of the improvements may be used without others.

Having thus described my invention, I claim:

1. In a combined typewriting and computing machine, the combination with a typewriter frame, a traveling carriage supported thereby, and a computing head, of controlling mechanism for governing the state of said computing head, a slidable frame mounted at the side of the typewriter frame, and means carried by said frame to individually coöperate with said controlling mechanism in the different positions said frame may occupy for any position of the carriage.

2. In a combined typewriting and computing machine, the combination with a typewriter frame, a traveling carriage supported thereby, and a computing head, of a series of locators arranged end to end in longitudinal alinement at the side of the typewriter frame, each locator arranged to individually coöperate with the computing head to control the different states thereof in any column determined by the typewriter carriage.

3. In a combined typewriting and computing machine, the combination with a typewriter frame, a traveling carriage supported thereby, and a computing head, of a slidable frame mounted at the side of the typewriter frame, and means carried by said slidable frame to individually coöperate with said computing head, to concomitantly control different states thereof according to the different positions said frame may occupy for any position of said carriage.

4. The combination with a computing head, of controlling mechanism for governing the state of said computing head, a slidable plate for governing said controlling mechanism, said plate having an opening therein with a plurality of spaced fingers projecting into said opening, and a plurality of removable and replaceable locators secured by said fingers against movement longitudinally on said plate and arranged to position said controlling mechanism.

5. In a combined typewriting and computing machine, the combination with a plurality of computing heads, of a longitudinally slidable plate for controlling different states of said computing heads, said plate having side sections, top and bottom sections, and an intermediate section, said bottom and intermediate sections supporting each a plurality of locators, one series of locators for each computing head, and a retaining bar for each series of locators to hold the same in position on their respective sections of said plate, whereby said locators may act to control said computing heads according to longitudinal positions occupied by said plate.

6. The combination with a computing head, of controlling mechanism for governing the state of said computing head comprising a plate having an opening therein with a plurality of spaced fingers projecting into said opening, and a plurality of removable and reversible locators having slots therein to engage said fingers, so that said locators form a unit with said plate in either position of their adjustment, so that they may determine the position of said state-controlling mechanism at various positions of said plate.

7. The combination with a computing head, of controlling mechanism for governing the state of said computing head comprising a plate having an opening therein with a plurality of spaced fingers projecting into said opening, a plurality of locators secured by said fingers and arranged to position said controlling mechanism, each of said locators having a positioning point with guiding surfaces leading thereto, and a retaining bar pivotally mounted for engagement with all of said locators to hold them in position on said plate, said fingers preventing movement of said locators in one direction under camming action of said guiding surfaces, and said retaining bar preventing movement of said locators in another direction under said camming action.

8. The combination with a computing head, of controlling mechanism for governing the state of said computing head, a plate having an opening therein with a plurality of spaced dents projecting into said opening, a plurality of locators secured by said dents and said plate and arranged to position said controlling mechanism, and a pivotally mounted retaining bar for engagement with all of said locators to hold them in position on said plate.

9. The combination with a computing head, of controlling mechanism for governing the state of said computing head, a plate having an opening therein with a plurality of spaced dents projecting into said opening, a plurality of locators secured by said dents and said plate and arranged to position said controlling mechanism, a pivotally mounted retaining bar for engagement with all of said locators to hold them in position on said plate, and spring means for normally holding said bar in engagement with said locators.

10. The combination with a typewriter frame, a traveling carriage carried thereby, and a computing head, of controlling mechanism for determining the state of said computing head, governing mechanism for said controlling mechanism including a plate movably mounted at the side of the typewriter frame, and a series of locators mounted on said plate, each locator having a positioning point to determine the position of said controlling mechanism, the positioning points in the same series of certain of said locators being out of alinement with the positioning points of certain others of said locators, whereby said plate may differently control the computing head in different longitudinal positions of said plate for any position of said carriage.

11. The combination with a computing head, of controlling mechanism for said computing head, a plate having a plurality of openings therein, fingers extending up from the bottom of each of said openings, a series of locators supported by said fingers in lateral alinement in said openings, and a retaining bar engaging the tops of said locators to secure them in position on said plate against vertical movement, said locators coöperating with said controlling mechanism to govern the state of said computing head.

12. In a combined typewriting and computing machine, the combination with a traveling carriage, of a computing mechanism including a computing head, and mechanism for governing the state of said computing head including a frame supported on its edge, said frame carrying controlling devices to coöperate with said computing head to control the state thereof, and said frame movable edgewise from side to side to bring its state-controlling devices individually to coöperate with the computing head to produce different states thereof in the different positions said frame may occupy for any position of said carriage.

13. The combination with a computing head, of controlling mechanism for governing the state of said computing head comprising a plate having an opening therein with a plurality of spaced retaining means projecting into said opening, and a plurality of removable and reversible locators, said locators having formations on opposite sides thereof for governing said controlling mechanism, each of said locators also having parts for engaging said retaining means, said parts located midway between said governing formations to engage said retaining means to hold said locators in position, so that they form a unit with said plate in either position of their adjustment, so that they may determine the position of said state-controlling mechanism at various positions occupied by said plate.

14. The combination with two primary elements, to wit, a computing head having a series of computing members and a master member for driving said computing head, said primary elements having a relative traveling movement to bring said master member *seriatim* into register with each of said computing members, of a traveling typewriter carriage having a step-by-step movement and controlling the relative movement between said primary elements, and a manually-movable carriage independent of said typewriter carriage and having a movement transverse to the movement of the typewriter carriage for controlling the state of said computing head.

15. The combination with a totalizer, of means for determining how numbers shall be computed in it, a manually slidable controlling device for positively manipulating said means in any desired order of computation, and connections whereby said device may be moved clear of said means and enabling said means to be manipulable manually.

WALTER WRIGHT.

Witnesses:
LORENZ L. PRITZL,
EDWARD THOMAS.

Copies of this patent may be obtained for five cents each, by addressing the "Commissioner of Patents, Washington, D. C."